United States Patent [19]
Hughes et al.

[11] 3,877,480
[45] Apr. 15, 1975

[54] NOZZLE VALVE ASSEMBLY

[75] Inventors: James L. Hughes; James E. Lawrence, both of Cincinnati, Ohio

[73] Assignee: Dover Corporation, Cincinnati, Ohio

[22] Filed: Jan. 11, 1973

[21] Appl. No.: 322,886

Related U.S. Application Data

[63] Continuation of Ser. No. 125,263, March 17, 1971, abandoned.

[52] U.S. Cl. ............ 137/329.06; 251/239; 251/321
[51] Int. Cl. ................................................. F16k 25/00
[58] Field of Search ............ 251/323, 239, 321, 88, 251/339, 320, 357; 137/329.06, 329, 329.01

[56] References Cited
UNITED STATES PATENTS

| | | | |
|---|---|---|---|
| 82,844 | 10/1868 | Jenkins | 137/329.06 |
| 2,001,487 | 5/1935 | Doherty | 251/323 X |
| 2,271,151 | 1/1942 | Fina et al. | 251/239 X |
| 2,318,933 | 5/1943 | Eilers et al. | 251/239 X |
| 2,768,643 | 10/1956 | Acomb | 251/332 X |

FOREIGN PATENTS OR APPLICATIONS

| | | | |
|---|---|---|---|
| 898,423 | 6/1962 | United Kingdom | 251/239 |

*Primary Examiner*—Arnold Rosenthal
*Attorney, Agent, or Firm*—John G. Schenk

[57] ABSTRACT

A poppet valve for a fluid dispensing nozzle for controlling flow of fluid past a valve seat in said nozzle wherein the parts of the poppet valve are held together only by means of an actuating stem, which serves to move the poppet valve away from the seat, and a spring acting on said poppet valve to urge said poppet valve against said seat. In another embodiment, the poppet valve is formed of a single metallic casting to which sealing means is bonded.

1 Claim, 13 Drawing Figures

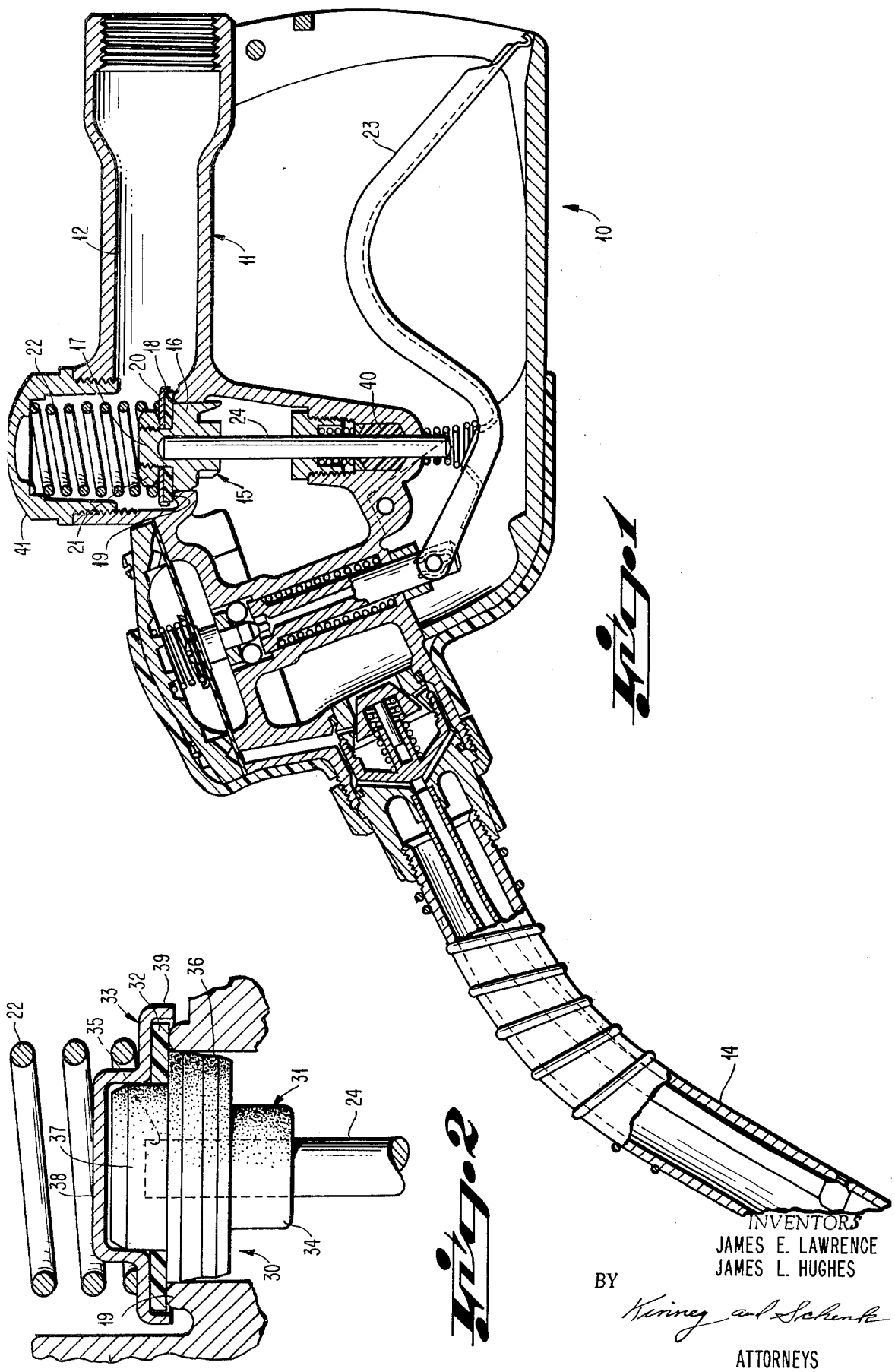

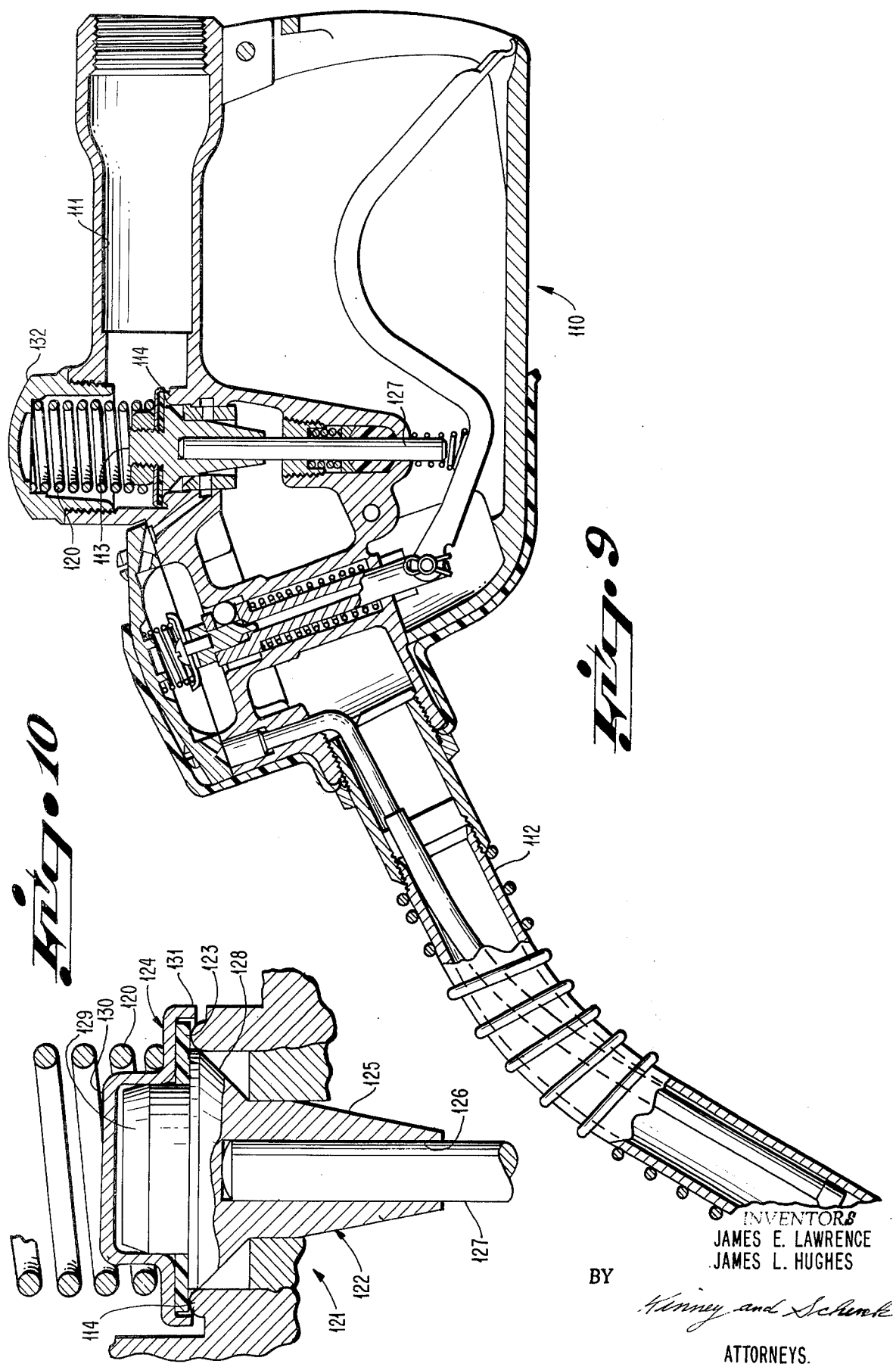

INVENTORS
JAMES E. LAWRENCE
JAMES L. HUGHES
BY Kinney and Schenk
ATTORNEYS.

NOZZLE VALVE ASSEMBLY

This is a continuation of application Ser. No. 125,263, filed Mar. 17, 1971 now abandoned.

In a dispensing nozzle for gasoline, the flow from an inlet passage in the nozzle to an outlet spout is controlled by a poppet valve which is resiliently biased against a valve seat by a spring. An actuating stem, which is movable by a pivotally mounted handle of the nozzle, extends into the poppet valve and moves the poppet valve against the force of the spring when flow of the gasoline is desired from the inlet passage to the spout.

To control the amount of flow, particularly in certain types of dispensing nozzles, the skirt of the poppet valve must be made with close tolerances since a portion of the skirt controls the flow. This skirt has previously been formed of cast metal, and the casting has been machined to obtain the close tolerances. However, this machining of the cast skirt to a close tolerance has resulted in a relatively expensive poppet valve. Additionally, the tolerances have depended upon the skill of the machinist so that a scrap problem has existed.

The present invention satisfactorily overcomes the foregoing problems by utilizing a skirt of molded plastic material in some embodiments. Thus, the skirt of the poppet valve can be easily manufactured to the desired close tolerances at a relatively low cost.

The previously employed poppet valve has included a resilient sealing disc and a stamped metallic plate above the resilient element. The stamped plate has a larger periphery than the periphery of the valve seat against which the resilient sealing disc abuts when the poppet valve is in a closed position.

The stamped plate has required a larger periphery than the periphery of the valve seat so that the plate can prevent flow through the passage in the nozzle if there would be a fire since the resilient sealing means would melt. Otherwise, because of the pressure of the gasoline in the tank to which the nozzle is connected, the gasoline would flow through the passage after the resilient sealing means has melted.

The previously suggested poppet valve has secured the resilient sealing disc and the stamped plate to the skirt by utilizing a nut, which cooperates with an upper threaded portion of the skirt that extends through aligned openings in the resilient sealing disc and the stamped plate. Furthermore, the nut has been staked to the upper threaded portion of the skirt during assembly.

Accordingly, assembly of the previously employed poppet valve has been time consuming and expensive. Furthermore, the replacement of the sealing element in the field has been an extremely difficult chore for the repairman. This is because it has taken the removal of the nut, which is staked to the skirt, before the sealing element may be replaced. This has required a special tool and a substantial amount of time.

The present invention satisfactorily overcomes the foregoing problems by utilizing a poppet valve in which the elements may be easily assembled or disassembled. Thus, the time and cost to assemble the poppet valve of the present invention is substantially lower than that of the previously available poppet valve. Furthermore, easy and quick replacement of the sealing element in the field may be accomplished when the poppet valve of the present invention is employed.

Instead of utilizing the molded plastic skirt with the separate resilient sealing disc and the metallic top piece as some embodiments of the present invention contemplates casting a metallic body to which the sealing disc may be bonded. Thus, the skirt and the top piece may be formed of a single element. While the flow control portion of the body would require machining to close tolerances, casting of the entire body eliminates any assembly of the elements in comparison with the time to assemble and disassemble the previously suggested poppet valve.

Furthermore, replacement in the field of the poppet valve having the entire body of cast metal may be easily accomplished since it is only necessary to remove the body, which has the sealing disc bonded thereto, and substitute a new body therefore. Thus, this embodiment of the present invention enables quick assembly and disassembly along with quick replacement in the field. However, it does now require the precise machining of the cast body.

An object of this invention is to provide a poppet valve for a dispensing nozzle in which the tolerances of the poppet valve in the flow control portion may be easily controlled during manufacture.

Another object of this invention is to provide a relatively inexpensive poppet valve for a dispensing nozzle.

A further object of this invention is to provide a poppet valve for a dispensing nozzle in which the elements of the poppet valve may be easily replaced in the field.

Still another object of this invention is to provide a light-weight poppet valve for a dispensing nozzle.

A still further object of this invention is to provide a poppet valve that may be easily assembled and disassembled.

Other objects, uses, and advantages of this invention are apparent upon a reading of this description, which proceeds with reference to the drawings forming part thereof and wherein:

FIG. 1 is a sectional view of the dispensing nozzle with the previously available poppet valve being shown in its closed position.

FIG. 2 is a fragmentary sectional view, partly in elevation, of a portion of the nozzle of FIG. 1 and showing one embodiment of the poppet valve of the present invention that may be used with the nozzle of FIG. 1.

FIG. 9 is a sectional view of another form of the dispensing nozzle with the previously available poppet valve being shown in its closed position.

FIG. 10 is a fragmentary sectional view, partly in elevation, of a form of the poppet valve of the present invention that may be employed with the nozzle of FIG. 9.

Figure 3:
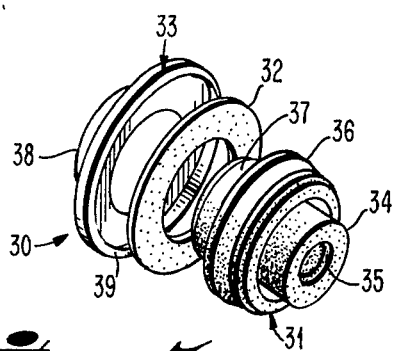
FIG. 3 is an exploded perspective view of the poppet valve of FIG. 2 with its parts disassembled.

Referring to the drawings and particularly FIG. 1, there is shown an automatic dispensing nozzle 10 comprising a housing 11 within which is disposed an inlet passage 12. The inlet passage 12 is connected through a hose to a gasoline tank or the like from which gasoline is supplied under pressure.

The flow through the nozzle 10 from the inlet passage 12 to an outlet spout 14 is controlled by a poppet valve 15. A poppet valve 15 includes a metallic skirt 16, which is a casting and has an upwardly projecting threaded portion 17. A resilient sealing disc or element 18 is supported on the skirt 16 and cooperates with a valve seat 19 in the housing 11 to stop flow from the inlet passage 12 to the outlet spout 14.

The poppet valve 15 also includes a stamped metallic plate 20 disposed above the sealing element 18 and supported by the skirt 16. The plate 20 has a larger periphery than the periphery of the valve seat 19 to prevent flow from the inlet passage 12 to the spout 14 in the event of a fire when the sealing disc 18 would melt.

A nut 21 is threaded on the upper threaded portion 17 of the skirt 16 to look the sealing disc 18 and the plate 20 to the skirt 16. The nut 21 is staked to the upper portion 17 of the skirt 16.

A spring 22 continuously urges the poppet valve 15 to the position of FIG. 1 in which the sealing disc 18 engages the valve seat 19 to prevent flow from the inlet passage 12 to the spout 14. The poppet valve 15 is moved to an open position by a pivotally mounted handle 23 moving a stem 24, which is disposed within a passage in the skirt 16, upwardly. This overcomes the force of the spring 22 and moves the sealing disc 18 of the poppet valve 15 away from the valve seat 19. The amount of the upward movement in the poppet valve determines the rate of flow from the inlet passage 12 to the outlet spout 14 since the skirt 16 has its side surfaces machined with a specific contour for cooperation with the wall of the housing 11 forming the seat 19.

The nozzle 10 includes an automatic shut-off mechanism for stopping flow from the inlet passage 12 to the outlet spout 14 by automatically returning the poppet valve 15 to its closed position. The automatic shut-off arrangement is specifically described in the U.S. Pat. No. 3,085,600 to Briede.

Referring to FIGS. 2 and 3, there is shown a poppet valve 30 of the present invention for use with the nozzle 10 of FIG. 1 in place of the poppet valve 15. The poppet valve 30 includes a skirt 31, a sealing disc or element 32, and a metallic top piece 33.

The skirt 31 is formed through injection molding of a suitable plastic. One suitable example of the plastic of the skirt 31 is acetal resin sold under the tradename Delrin by duPont. Any other suitable plastic material that can be molded within certain critical tolerances may be employed.

The skirt 31 includes a hub 34 having a longitudinal passage 35 within which is disposed the stem 24. The skirt 31 also includes a flow control portion 36, which is shaped to cooperate with the wall of the housing 11 defining the valve seat 19 so as to regulate the quantity of flow past the poppet valve 30. The skirt 31 also has an upper guide portion 37 to serve as a guide for the sealing disc 32, which is formed of a suitable resilient material such as Buna-N, for example, and for the metallic top piece 33.

The top piece 33 has a centrally disposed boss 38, which fits over the upper guide portion 37 of the skirt 31 and serves as a guide for the lower end of the spring 22. The top piece 33 also has an outer flange 39, which is of a larger periphery than that of the valve seat 19. Since the materials of the skirt 31 and the sealing disc 32 would melt during a fire, the flange 39 of the top piece 33 would stop slow from the passage 12 to the spout 14 of the nozzle 10 because of the flange 39 being disposed over the top of the seat 19 due to the larger periphery of the flange 39.

To assemble the poppet valve of FIGS. 2 and 3, it is only necessary to position the skirt 31 on the upper end of the stem 24 by disposing the stem 24 in the passage 35, which terminates in the upper portion 37 of the skirt 31. The stem 24 is normally held by friction in a packing 40 of the nozzle 10 but is slidable relative thereto when the handle 23 is actuated to open the poppet valve 30.

Then, the sealing disc 32 is placed over the upper guide portion 37 of the skirt 31. Next, the top piece 33 is positioned over the sealing disc 32 and the guide portion 37 of the skirt 31. The spring 22 is then disposed within the housing 11 with one end engagine the top piece 33 and its other end contacting a removable retaining cap 41 (see FIG. 1), which holds the spring 22 in position.

Thus, by forming the poppet valve 30 with the skirt 31 of plastic, the shape of the flow control portion 36 is easily controlled to the desired tolerances through injection molding. Furthermore, the elements of the poppet valve 30 may be readily and quickly assembled or disassembled. That is, to remove the retaining cap 41, the spring 41, the spring 22, and the top piece 33. Thus, quick and inexpensive replacement of the sealing disc 32 may be accomplished in the field.

Figure 4:
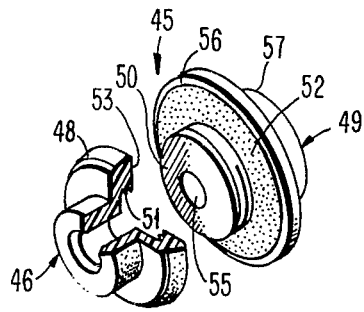
FIG. 4 is an exploded perspective view, partly in section, of another form of the poppet valve of the present invention that may be used with the nozzle of FIG. 1.

Referring to FIG. 4, there is shown a poppet valve 45. The poppet valve 45 inlcudes a skirt 46 having a hub 47 and a flow control portion 48. The skirt 46 is formed of the same plastic as the skirt 31 so that the tolerance of the flow control portion 48 are closely regulated.

The poppet valve 45 has a metallic top piece 49, which includes a lower cylindrical portion 50 threaded on its outer surface for cooperation with threads 51 on an inner surface of the skirt 46. Thus, the top piece 49 is releasably secured to the skirt 46.

A sealing disc 52, which is preferably formed of the same material as the sealing disc 32, is mounted on the lower cylindrical portion 50 of the top piece 49 and engages an upper surface 53 of the skirt 46. The sealing disc 52 has a larger diameter than the upper surface 53 of the skirt 46 so that the sealing disc 52 can engage the valve seat 19.

Accordingly, the poppet valve 45 may be assembled through securing the threaded lower cylindrical portion 50 of the top piece 49 to the threads 51 of the skirt 46 with the sealing disc 52 already supported on the lower cylindrical portion 50. Then, the poppet valve 45 is mounted on the stem 24, which extends through a longitudinal passage 54 in the skirt 46 and into an aligned longitudinal passage 55 in the top piece 49.

The top piece 49 has a flange 56, which surrounds the outer surface of the sealing disc 52. The flange 56 has a greater periphery than the periphery of the valve seat 19 in the same manner as the flange 39 of the top piece 33 of the poppet valve 30 of FIGS. 2 and 3. The top piece 49 also has a centrally disposed boss 57 to serve as a guide for the spring 22 in the same manner as the boss 38.

Figure 5:
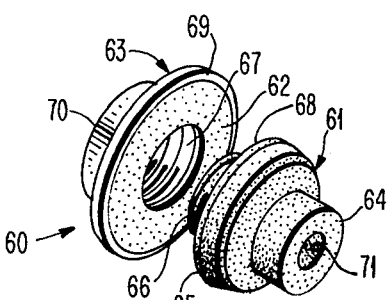
FIG. 5 is an exploded perspective view of another modification of the poppet valve of the present invention that may be employed with the nozzle of FIG. 1.

Referring to FIG. 5, there is shown a poppet valve 60 for use with the nozzle 10 of FIG. 1. The poppet valve 60 includes a skirt 61, a sealing disc 62, and a metallic top piece 63. The skirt 61 includes a hub 64, a flow control portion 65, and an upper guide portion 66.

The skirt 61 is formed of molded plastic in the same manner as the skirt 31 of the poppet valve 30. The upper guide portion 66 of the skirt 61 is threaded for cooperation with threads 67 on an inner wall of the top piece 63.

The sealing disc 62, which is preferably formed of the same material as the sealing disc 32, is disposed over the upper cylindrical portion 66 of the skirt 61 and rests against an upper cylindrical portion 68 of the flow control portion 65 of the skirt 61. The sealing disc 62 also bears against a surface (not shown) of the top piece 63 and is held therebetween. The diameter of the sealing disc 62 is larger than the diameter of the flow control portion 65 so that the sealing disc 62 can bear against the valve seat 19.

The top piece 63 has an outer flange 69, which surrounds the sealing disc 62 and is of a larger periphery than the periphery of the valve seat 19. The top piece 63 also has a centrally disposed boss 70 to serve as a guide for the spring 22 in the same manner as the boss 38.

The poppet valve 60 may be assembled prior to disposition within the nozzle 10. This would be accomplished by threading the upper cylindrical portion 66 of the skirt 61 with the threads 67 of the top piece 63 with the sealing disc 62 supported therebetween. The remainder of the assembly would be in the same manner as decribed for the poppet valve 45.

Of course, the stem 24 would extend only into a longitudinal passage 71 in the skirt 61. The stem 24 does not extend into the top piece 63 since the passage 71 terminates in substantially the same plane as the upper surface 68 of the flow control portion 65.

Figure 6:
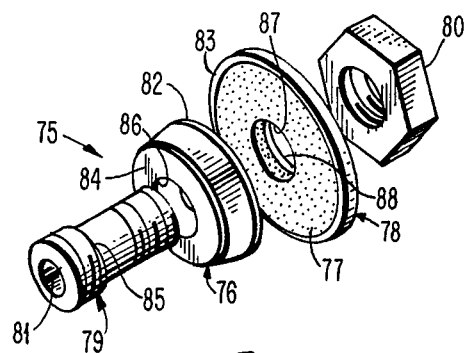
FIG. 6 is an exploded perspective view of a further form of the poppet valve of the present invention that may be used with the nozzle of FIG. 1.

Referring to FIG. 6, there is shown a poppet valve 75 of the present invention. The poppet valve 75 includes a skirt 76, sealing disc 77, a metallic top piece 78, a metallic support screw 79, and a metallic nut 80. The skirt 76, which is formed of the same molded material as the skirt 31, comprises only the flow control portion of the poppet valve 75 since the screw 79 functions as the hub into which the stem 24 is inserted through a longitudinal passage 81 in the screw 79. The passage 81 does not extend for the entire length of the screw 79 but terminates in substantially the same plane, when assembled, as upper surface 82 of the skirt 76.

Furthermore, the top piece 78 comprises only a flat plate having an outer downwardly depending flange 83 of a larger periphery than the periphery of the valve seat 19. The sealing disc 77, which is preferably formed of the same material as the sealing disc 32, is disposed between the upper surface 82 of the skirt 76 and the lower surface of the flat portion of the top piece 78. The sealing disc 77 has a larger diameter than the upper surface 82 of the skirt 76 so as to engage the valve seat 19.

In assembly of the poppet valve 75 of FIG. 6, the skirt 76 has its lower surface 84 resting on a shoulder 85 of the screw 79. The sealing disc 77 is disposed between the upper surface 82 of the skirt 76 and the top piece 78. The screw 79 passes through an opening 86 in the skirt 76, and opening 87 in the sealing disc 77, and an opening 88 in the top piece 78. The nut 80, which is threaded on the end of the screw 79, bears against the upper surface of the top piece 78 to form the assembled poppet valve 75.

This assembly of the poppet valve 75 occurs prior to inserting the poppet valve 75 into the nozzle 10. The remainder of the assembly is in the same manner as described for the poppet valve 45 and 60. It should be noted that the nut 80 serves as the guide for the spring 22.

Figure 7:
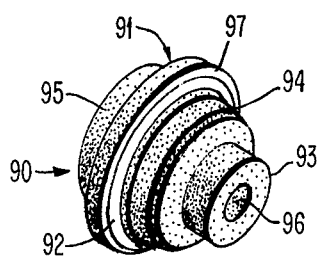
FIG. 7 is a perspective view of still another modification of the poppet valve of the present invention that may be employed with the nozzle of FIG. 1.

Referring to FIG. 7, there is shown a poppet valve 90 for use with the nozzle 10. The poppet valve 90 comprises a cast body 91, which may be formed of aluminum or zinc, for example, and a sealing disc 92, which is molded to the body 91 and preferably formed of the same material as the sealing disc 32. The body 91 includes a hub 93, a flow control portion 94, and a top piece 95. The hub 93 and the flow control portion 94 may be deemed to form a skirt.

The hub 93 of the body 91 has a longitudinal passage 96 to receive the stem 24. The passage 96 terminates in substantially the same plane as the sealing disc 92.

The top piece 95 has an outer flange 97 of greater periphery than the periphery of the valve seat 19. The top piece 95 also includes a centrally disposed boss to serve as a guide for the spring 22 in the same manner as the boss 38.

Accordingly, the poppet valve 90 will require some machining for the flow control portion 94 to have the desired tolerances even though the body 91 has been cast. However, the poppet valve 90 requires no further assembly since the sealing disc 92 is molded to the body 91. Thus easy assembly of the poppet valve 90 in the nozzle 10 is accomplished with this modification.

Figure 8:
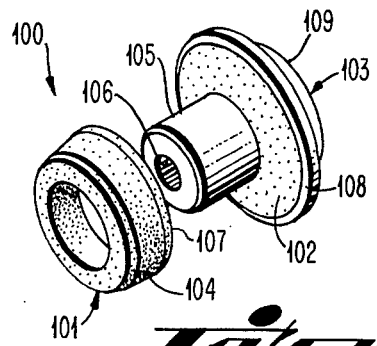
FIG. 8 is an exploded perspective view of a yet further embodiment of the poppet valve of the present invention that may be used with the nozzle of FIG. 1.

Referring to FIG. 8, there is shown a poppet valve 100, which includes a molded plastic skirt 101, a sealing disc 102, and a metallic top piece 103. The skirt 101, which is formed of the same plastic material as the skirt 31, includes a flow control portion 104 for cooperation with the wall of the valve seat 19 to regulate the quantity of flow. The skirt 101 is press fitted on a hub 105 of the top piece 103.

The hub 105 has a longitudinal passage 106 therein to receive the stem 24. The passage 106 terminates in substantially the same plane as the plane in which the sealing disc 102, which is preferably formed of the same material as the sealing disc 32, is disposed.

When the skirt 101 is press fitted on the hub 105 of the top piece 103, the sealing disc 102 is supported between an upper surface 107 of the skirt 101 and a lower surface of the top piece 103. The top piece 103 also has centrally located flange 108, which surrounds the sealing disc 102, of a greater periphery than the periphery of the valve seat 19. The top piece 103 also has a centrally disposed boss 109 to serve as a guide for the spring 22 in the same manner as the boss 38.

The poppet valve 100 is assembled by disposing the sealing disc 102 on the hub 105 and then press fitting the skirt 101 on the hub 105. Then, the assembled poppet valve 100 may be easily mounted in the nozzle 10.

Referring to FIG. 9, there is shown a nozzle 110, which is similar to the nozzle 10 but utilizes a different venturi arrangement for automatically stopping flow from an inlet passage 111 to an outlet spout 112. The venturi arrangement is more specifically described in U.S. Pat. No. 2,582,195 to Duerr. The nozzle 110 has a poppet valve 113 cooperating with a valve seat 114 to stop the flow therethrough when the poppet valve 113 is in the position shown in FIG. 9.

Figure 11:
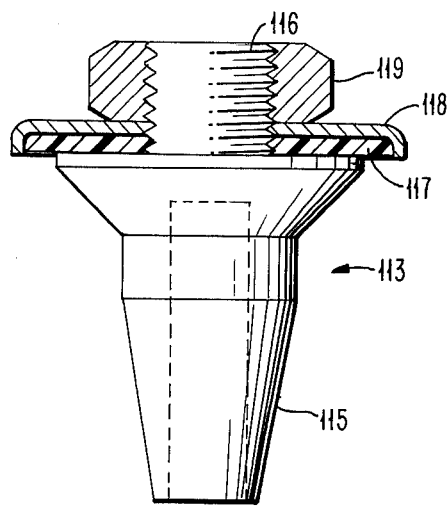
FIG. 11 is a fragmentary sectional view, similar to FIG. 10, of the previously available poppet valve used with the nozzle of FIG. 9 and in its assembled relation.
Figure 12:
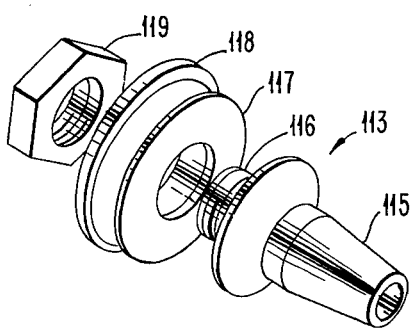
FIG. 12 is an exploded perspective view of the poppet valve of FIG. 11 with its parts disassembled.

As shown in FIGS. 11 and 12, the poppet valve 113 includes a metallic skirt 115 having an upper threaded portion 116, a sealing disc 117, a metallic top piece 118, and a nut 119. The nut 119 serves as a guide for a spring 120, which urges the poppet valve to the closed position of FIG. 9. In formation of the poppet valve 113, the nut 119 is staked to the upper portion 116 of the skirt 115.

Figure 13:
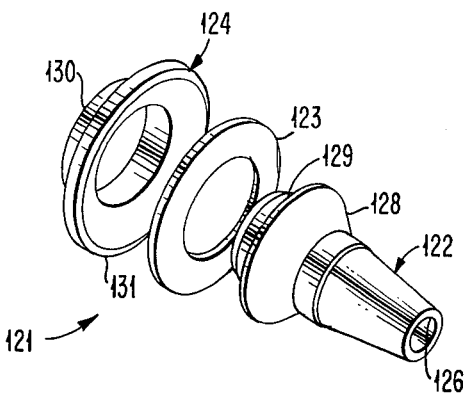
FIG. 13 is an exploded perspective view of the poppet valve of FIG. 10 with its parts disassembled.

Referring to FIGS. 10 and 13, there is shown a poppet valve 121 of the present invention that may be employed with the nozzle 110 in place of the poppet valve 113. The poppet valve 121 includes a molded plastic skirt 122, a sealing disc 123, and a metallic top piece 124.

The skirt 122, which is formed of the same material as the skirt 31, has a hub 125 with a longitudinal passage 126 therein to receive a stem 127 of the nozzle 110. The skirt 122 also has a flow control portion 128, which cooperates with the wall defining the valve seat 114 to regulate the flow from the inlet passage 111 of the nozzle 110 to the spout 112.

The skirt 122 also has an upper portion 129 to serve as a guide for the sealing disc 123, which is preferably formed of the same material as the sealing disc 32. The upper portion 129 guides a central disposed boss 130 of the top piece 124. The boss 130 serves as a guide for the spring 120 in the same manner as the boss 38 does for the spring 22.

The top piece 124 has an outer flange 131 of a greater periphery than the periphery of the seat 114.

The assembly of the poppet valve 121 is easily accomplished through disposing the skirt 122 on the stem 127 and then positioning the sealing disc 123 over the upper portion 129 of the skirt 122. Next, the top piece 124 is mounted over the upper portion 129 of the skirt 122. Thereafter, the spring 120 has one end abut against the top piece 124 while its other end engages a removable retaining cap 132 (see FIG. 9) of the nozzle 110.

An advantage of this invention is that it is less expensive to manufacture and assemble than previously available poppet valves for dispensing nozzles. Another advantage of this invention is that the tolerance problem for the flow control portion of the poppet valve is substantially less than in previously available poppet valves for dispensing nozzles. Still another advantage of this invention is that the weight of the poppet valve is reduced. A still further advantage of this invention is that any element of the poppet valve may be easily replaced in the field.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In a gasoline dispensing nozzle having a passage, a valve seat within the passage, a poppet valve to control flow through said passage and cooperating with said seat to stop flow through said passage, an actuating stem engaging said poppet valve to move said poppet valve away from said seat to allow flow through said passage, and a spring acting on said poppet valve to urge said poppet valve against said seat, said poppet valve including a heat destructible skirt, said skirt including a flow control portion shaped to cooperate with the flow passage to regulate the quantity of flow past said poppet valve, and an upper guide portion, said upper guide portion having a diameter width substantially greater than the guide portion axial length, a heat destructible sealing disc mounted on said upper guide portion and being axially movable thereon, said guide portion positioning said sealing disc relative to said seat, said sealing disc engaging said seat to stop flow through said passage, and a member mounted over said skirt upper guide portion and disposed to have one end of said spring acting thereagainst, said member having a centrally disposed boss to cooperatively receive said skirt upper guide portion, said spring having a width greater than said member boss wherein said one end of said spring is disposed thereover so that said boss is a guide for said spring; said sealing disc being disposed between said skirt and said member, said upper guide portion associated between said skirt and said member axially aligning said skirt and said member, said skirt being free to move axially with respect to said member and said disc when said disc is in sealing engagement with said seat, and said member having a periphery larger than the periphery of said seat wherein said member will engage said seat to stop flow through said passage in the event of disc and skirt destruction.

* * * * *